United States Patent
Fujihara

(10) Patent No.: US 9,422,004 B2
(45) Date of Patent: Aug. 23, 2016

(54) VEHICLE BODY FRONT SECTION STRUCTURE

(71) Applicant: TOYOTA JIDOSHA KABUSHIKI KAISHA, Toyota-shi (JP)

(72) Inventor: Akito Fujihara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/818,807

(22) Filed: Aug. 5, 2015

(65) Prior Publication Data

US 2016/0083013 A1    Mar. 24, 2016

(30) Foreign Application Priority Data

Sep. 19, 2014  (JP) .................................. 2014-191663

(51) Int. Cl.
  *B62D 21/15* (2006.01)
  *B62D 25/08* (2006.01)
(52) U.S. Cl.
  CPC .............. *B62D 21/15* (2013.01); *B62D 21/152* (2013.01); *B62D 25/082* (2013.01)
(58) Field of Classification Search
  CPC ...... B62D 21/02; B62D 21/15; B62D 21/152; B62D 25/08; B62D 25/082
  USPC ............. 296/187.03, 187.09, 193.09, 203.02, 296/205
  See application file for complete search history.

(56) References Cited

U.S. PATENT DOCUMENTS

| 5,100,189 | A  | * | 3/1992 | Futamata | B62D 21/152 293/132 |
| 7,641,270 | B2 | * | 1/2010 | Takeda | B62D 21/152 296/193.09 |
| 2008/0098601 | A1 | * | 5/2008 | Heinz | B21D 39/20 29/897.2 |
| 2009/0236166 | A1 | * | 9/2009 | Kowaki | B62D 21/152 180/232 |
| 2015/0151792 | A1 | * | 6/2015 | Mori | B62D 21/152 296/187.09 |

FOREIGN PATENT DOCUMENTS

JP    2012-206703    10/2012

* cited by examiner

*Primary Examiner* — Jason S Daniels
(74) *Attorney, Agent, or Firm* — Oblon, McClelland, Maier & Neustadt, L.L.P

(57) ABSTRACT

There is provided a vehicle body front section structure including: a dash panel; and a front side member comprising a side member front section, and a side member rear section, wherein the side member front section includes: a front side; a rear side; and a weakened portion that is formed to a side wall of the side member front section at a vehicle body up-down direction upper side of a boundary between the front side location and the rear side location, and that is set such that a crush amount at an upper side of the weakened portion is greater than a crush amount at a lower side of the weakened portion when collision load is input from the vehicle body front side.

6 Claims, 2 Drawing Sheets

VEHICLE BODY FRONT SECTION STRUCTURE

CROSS-REFERENCE TO RELATED APPLICATION

This application is based on and claims priority under 35 USC 119 from Japanese Patent Application No. 2014-191663 filed on Sep. 19, 2014, the disclosure of which is incorporated by reference herein.

BACKGROUND

1. Technical Field

The present invention relates to a vehicle body front section structure.

2. Related Art

Technology to deform a front side member in a front section of a vehicle body in a desired mode in a vehicle front-on collision is known. For example, a structure exists in which a bead is provided extending along an up-down direction at an up-down direction intermediate portion of a side wall of a front side member inner, and portions of weak adhesive force are set in respective adhesion portions of a pair of upper sides flanges of a front side member, at a similar position to the bead in the vehicle body front-rear direction (see, for example, Japanese Patent Application Laid-Open (JP-A) No. 2012-206703). Such a structure attempts to control the position of fold deformation in the front side member by setting the bead as a deformation origin in a front-on collision of the vehicle, and suppressing the effect of the adhesion portions of the upper side flanges during deformation.

However, the related art described above leaves room for improvement in structures to suppress fold deformation of a front side member toward the vehicle body upper side in a vehicle front-on collision.

SUMMARY

In consideration of the above circumstances, an object of the present invention is to obtain a vehicle body front section structure capable of suppressing fold deformation of a front side member toward a vehicle body upper side in a front-on collision of the vehicle.

A first aspect of the present invention provides a vehicle body front section structure including:

a dash panel that partitions a power unit chamber from a cabin positioned at a vehicle rear side of the power unit chamber; and a front side member including a side member front section extending along a vehicle body front-rear direction at a side portion of the power unit chamber, and a side member rear section formed with a kick portion that is contiguous to a rear end portion of the side member front section and extends toward a vehicle body lower side following the dash panel, wherein the side member front section includes:

a front side location disposed on the front side of the side member front section in the vehicle body front-rear direction;

a rear side location that is contiguous to the front side location at a vehicle body rear side, and that is provided further to a vehicle body front side than a connection portion between the side member front section and the kick portion, with a height position of a lower face of the rear side location set lower than a height position of a lower face of the front side location, and with an extension direction of at least a front portion of the lower face of the rear side location set in a direction to intersect with an extension direction of the lower face of the front side location as viewed from the side of the vehicle body; and a weakened portion that is formed to a side wall of the side member front section at a vehicle body up-down direction upper side of a boundary between the front side location and the rear side location, and that is set such that a crush amount at an upper side of the weakened portion is greater than a crush amount at a lower side of the weakened portion when collision load is input from the vehicle body front side.

According to the above configuration, the lower face of the rear side location of the side member front section is set with a lower height position than the lower face of the front side location of the side member front section, and the extension direction of at least a front portion of the lower face of the rear side location is set in a direction to intersect with the extension direction of the lower face of the front side location. Accordingly, when collision load is input to the front side member in a front-on collision of the vehicle, there is a concentration of stress at the boundary between the lower face of the front side location and the lower face of the rear side location, and the side member front section attempts to fold deform toward the vehicle body upper side about an origin at the boundary.

The weakened portion is formed to the side wall of the side member front section at the vehicle body up-down direction upper side of the boundary between the front side location and the rear side location. Accordingly, when collision load is input to the front side member in a front-on collision of the vehicle, there is a concentration of stress at the weakened portion at the same timing as the concentration of stress at the boundary between the lower face of the front side location and the lower face of the rear side location. The weakened portion is set such that the crush amount at the upper side thereof is greater than the crush amount at the lower side when collision load is input from the vehicle body front side. Accordingly, when collision load is input to the side member front section and the weakened portion is crushed, the side member front section attempts to fold deform toward the vehicle body lower side about an origin at the weakened portion. Namely, a force acts in a direction to cancel out the force attempting to fold deform the side member front section toward the vehicle body upper side at the same timing. Fold deformation of the side member front section toward the vehicle body upper side is accordingly suppressed.

A second aspect of the present invention provides the vehicle body front section structure of the first aspect, wherein the rear side location includes:

a first rear side location that is disposed separated from the front side location toward the vehicle body rear side, and that forms a step between a lower face of the first rear side location and the lower face of the front side location; and a second rear side location that links between the front side location and the first rear side location, and that has a lower face inclined toward the vehicle body upper side on progression toward the vehicle body front side.

According to the above configuration, the rear side location, this having a lower face at a lower height position than that of the front side location, includes the first rear side location and the second rear side location. The first rear side location is disposed separated from the front side location toward the vehicle body rear side, and forms a step between the lower face of the first rear side location and the lower face of the front side location. Accordingly, for example, in cases in which another member is disposed at the vehicle body lower side of the rear side location, the first rear side location can easily be set as an attachment counterpart to the other member. Moreover, the second rear side location links between the front side location and the first rear side location, and the lower face of the second rear side location is inclined toward the vehicle body upper side on progression toward the vehicle body front side. Accordingly, in a front-on collision of the vehicle, an excessive concentration of stress at the boundary between the front side location and the rear side location at the lower face side of the side member front portion can be better suppressed than in, for example, a comparative structure in which a step is formed between a lower face of a front side location and a lower face of a rear side location, and the positions of a rear end of the lower face of the front side location and a front end of the lower face of the rear side location are aligned with each other along the vehicle body front-rear direction.

A third aspect of the present invention provides the vehicle body front section structure of the first aspect or the second aspect, wherein the weakened portion is set at a location touching an upper side ridge line of the side member front section.

According to the above configuration, the weakened portion can be effectively crushed by collision load transmitted along the upper side ridge line of the side member front section in a front-on collision of the vehicle.

A fourth aspect of the present invention provides the vehicle body front section structure of any one of the first through third aspects, wherein the weakened portion is configured by a bead that becomes gradually wider in the vehicle body front-rear direction on progression toward the vehicle body upper side.

According to the above configuration, when collision load is input to the side member front section and the bead is crushed in a front-on collision of the vehicle, the crush amount of the bead in the vehicle body front-rear direction increases on progression toward the vehicle body upper. Force attempting to fold deform the side member front section toward the vehicle body lower side about an origin at the bead can accordingly be made to act in a stable manner.

A fifth aspect of the present invention provides the vehicle body front section structure of any one of the first through fourth aspects, wherein:

a suspension member is disposed at the vehicle body lower side of the front side member;

the suspension member is coupled through a coupling portion to a vehicle body front-rear direction rear portion of the side member front section at a location further to the vehicle body front side than the connection portion between the side member front section and the kick portion; and the weakened portion is positioned further to the vehicle body front side than the coupling portion.

According to the above configuration, in the vehicle body front-rear direction rear portion of the side member front section, the weakened portion is positioned further toward the vehicle body front side than a location where rigidity is raised by the coupling portion that couples the suspension member together with the side member front section. This thereby further facilitates the concentration of stress at the weakened portion.

A sixth aspect of the present invention provides the vehicle body front section structure of any one of the first through sixth aspects, wherein:

the side member front section is formed with a closed cross-section portion extending along the vehicle body front-rear direction by an outer member disposed at a vehicle body width direction outside and an inner member disposed at the vehicle body width direction inside of the outer member;

the inner member includes a bent portion bending obliquely toward the vehicle body rear and vehicle body width direction inside at a location further toward the vehicle body front side than the connection portion between the side member front section and the kick portion; and the weakened portion is set at the bent portion.

According to the above configuration, the side member front section is formed with the closed cross-section portion extending along the vehicle body front-rear direction by the outer member and the inner member. The inner member includes the bent portion bending obliquely toward the vehicle body rear and vehicle body width direction inside at the location further toward the vehicle body front side than the connection portion between the side member front section and the kick portion. Accordingly, when collision load is input to the side member front section in a front-on collision of the vehicle, there is a concentration of stress at the bent portion. Crushing of the weakened portion by collision load is promoted due to setting the weakened portion at the bent portion.

As described above, the vehicle body front section structure of the present invention is capable of suppressing fold deformation of the front side member toward the vehicle body upper side in a front-on collision of the vehicle.

BRIEF DESCRIPTION OF THE DRAWINGS

Exemplary embodiments of the present invention will be described in detail based on the following figures, wherein.

DETAILED DESCRIPTION

Figure 1:
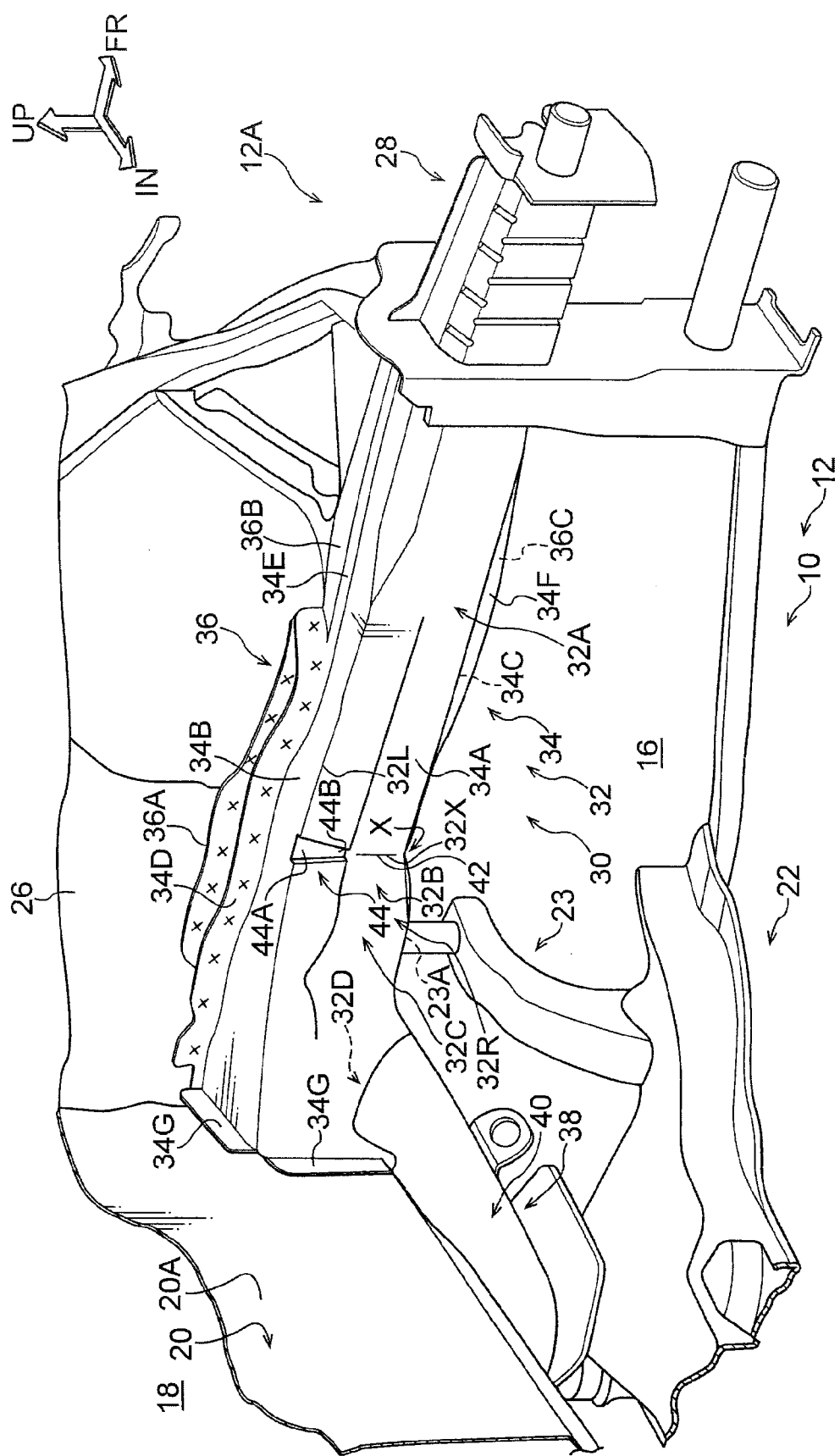
FIG. 1 is a perspective view illustrating a vehicle body front section structure according to an exemplary embodiment of the present invention.
Figure 2:
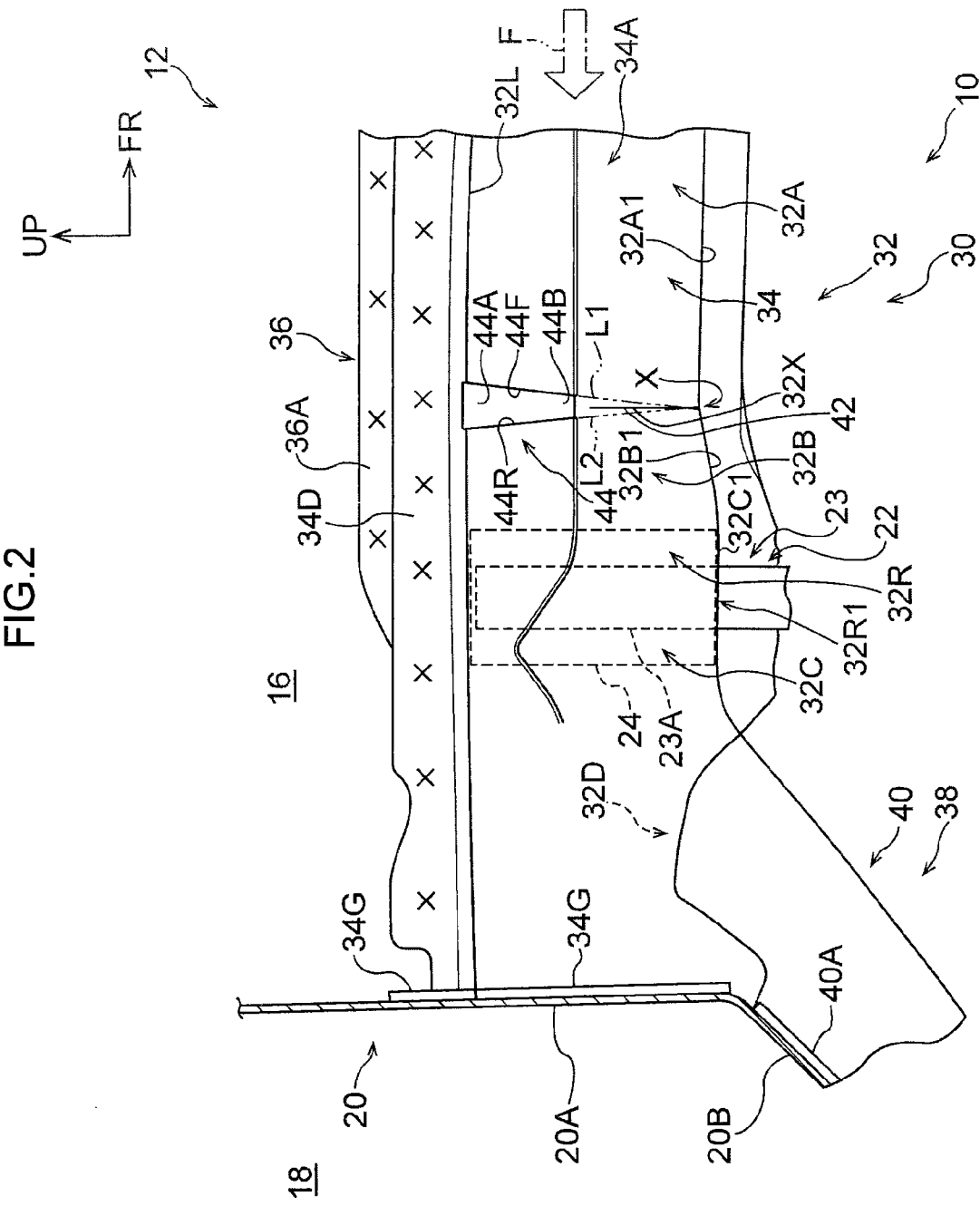
FIG. 2 is a side view illustrating part of the vehicle body front section structure in FIG. 1.

Explanation follows regarding a vehicle body front section structure according to an exemplary embodiment of the present invention, with reference to FIG. 1 and FIG. 2. In the drawings, the arrow FR indicates the vehicle body front side, the arrow UP indicates the vehicle body upper side, and the arrow IN indicates the vehicle body width direction inside, as appropriate. Unless specifically indicated otherwise, reference in the following explanation to simply the front-rear, up-down, and left-right directions refers to the front and rear in the vehicle body front-rear direction, up and down in the vehicle body up-down direction, and left and right as facing in the direction of travel.

Configuration of Exemplary Embodiment

FIG. 1 is a perspective view illustrating part of the left side of a vehicle body of a car (vehicle) 12 applied with a vehicle body front section structure 10, in a state viewed from a diagonal upper side on the vehicle body width direction inside. FIG. 2 is a side view illustrating part of the vehicle body front section structure 10. The right side of the vehicle body is not illustrated in the drawings; however, the vehicle body front section structure 10 is basically configured with left-right symmetry.

As illustrated in FIG. 1, in the car 12, a dash panel (a front wall of a passenger compartment of the vehicle body) 20 partitions a power unit chamber 16 from a cabin (vehicle cabin) 18 positioned at the vehicle rear side of the power unit chamber 16. An upper portion of the dash panel 20 is provided with an upright plate portion 20A formed in a substantially vertical plate shape. As illustrated in FIG. 2, a lower portion of the dash panel 20 is provided with a toe board portion 20B that is formed in an inclined plate shape and is integrally provided to the upright plate portion 20A. The toe board portion 20B is inclined toward the vehicle body rear side on progression toward the vehicle body lower side. A lower end portion of the toe board portion 20B is integrated together with a front end portion of a floor panel (not illustrated in the drawings, and also referred to as the "vehicle body floor") by joining using welding or the like. The floor panel configures a floor face of the cabin 18.

The power unit chamber 16 formed at the vehicle body front side of the cabin 18 houses a power unit, not illustrated in the drawings. In the present exemplary embodiment, as an example, the power unit is configured including an engine and a motor. Namely, the car 12 is a hybrid vehicle with two drive sources. The power unit chamber 16 may be understood to be what is known as an engine compartment.

A pair of left and right front side members 30 are provided on both vehicle body width direction sides of a lower portion of the power unit chamber 16 illustrated in FIG. 1. The front side members 30 will be described later. Bumper reinforcement (not illustrated in the drawings) is fixed to front end portions of the front side members 30 through respective crash boxes 28. The bumper reinforcement is disposed with its length direction along the vehicle body width direction in a vehicle body front section 12A. The bumper reinforcement configures part of a front bumper. Suspension towers 26 are provided at the vehicle body width direction outsides of the front side members 30, at the vehicle body front side of the dash panel 20.

Each of the front side members 30 includes a side member front section 32 extending along the vehicle body front-rear direction at a side portion of the power unit chamber 16. Each side member front section 32 is formed with a closed cross-section portion extending along the vehicle body front-rear direction by an outer member 36 disposed on the vehicle body width direction outside, and an inner member 34 disposed on the vehicle body width direction inside of the outer member 36. The pair of left and right side member front sections 32 support the power unit through an engine mount (not illustrated in the drawings).

The inner member 34 is formed with an open cross-section profile opening toward the vehicle body width direction outside as taken along the vehicle body width direction. Namely, a vehicle body front-rear direction intermediate portion and rear portion of the inner member 34 are formed in a hat shape opening toward the vehicle body width direction outside in a cross-section taken along the vehicle body width direction, and the cross-section profile of a front portion of the inner member 34 is formed in a shape in which an upper flange (labelled 34D) of the approximate hat shape has been laid flat so as to run horizontally toward the vehicle body width direction outside.

More specifically, the inner member 34 includes an inner side wall 34A, serving as a side wall configuring a side face on the vehicle body width direction inside of the side member front section 32. The inner member 34 also includes an inner upper wall 34B that is contiguous to an upper end portion of the inner side wall 34A and configures an upper face of the side member front section 32, and an inner lower wall 34C that is contiguous to a lower end portion of the inner side wall 34A and configures a lower face of the side member front section 32.

The upright wall shaped upper flange 34D extends out from a vehicle body width direction outside end portion of the inner upper wall 34B toward the vehicle body upper side at the vehicle body front-rear direction intermediate portion and rear portion of the inner member 34. In contrast, at the front portion of the inner member 34, a horizontal wall shaped upper flange 34E extends out from a vehicle body width direction outside end portion of the inner upper wall 34B toward the vehicle body width direction outside. An upright wall shaped lower flange 34F extends out from a vehicle body width direction outside end portion of the inner lower wall 34C toward the vehicle body lower side. A flange 34G is formed at a rear end of the inner member 34, and the flange 34G is joined to the dash panel 20 by welding.

The outer member 36 is formed in an upright wall shape, closes off the open side of the inner member 34, and configures a side wall on the vehicle body width direction outside of the front side member 30. An upper end portion 36A spanning from a vehicle body front-rear direction intermediate portion to a rear portion of the outer member 36 is superimposed with and joined by welding to the upper flange 34D of the inner member 34, and is also joined by welding to the suspension tower 26. An upper end portion 36B at a front portion of the outer member 36 configures a flange bent so as to extend out toward the vehicle body width direction outside. and is superimposed with and joined by welding to the upper flange 34E of the inner member 34. A lower end portion 36C of the outer member 36 is superimposed with and joined by welding to the lower flange 34F of the inner member 34.

The front side member 30 includes a side member rear section 38 configured at the vehicle body rear side of the side member front section 32. The side member rear section 38 is formed with a kick portion 40 that is contiguous to a rear end portion of the side member front section 32 and extends toward a vehicle body rear lower side, following the toe board portion 20B (see FIG. 2) of the dash panel 20. An upper end portion of the kick portion 40 is joined by welding to a rear lower end portion of the side member front section 32. Note that a connection portion between the side member front section 32 and the kick portion 40 is labelled with the reference numeral 32D in the drawings.

The kick portion 40 illustrated in FIG. 2 is disposed at the lower side of the toe board portion 20B, and is formed with a hat shaped cross-section profile opening toward the side of the toe board portion 20B as taken along a plane orthogonal to the length direction of the kick portion 40. Flanges 40A on both sides of the kick portion 40 are superimposed with, and joined by welding to, the toe board portion 20B.

The side member rear section 38 includes an underfloor portion (not illustrated in the drawings) that is contiguous to a rear end portion of the kick portion 40, and that extends toward the vehicle body rear side at a lower side of the floor panel (not illustrated in the drawings). The underfloor portion is formed with a hat shaped cross-section profile opening toward the side of the floor panel as taken along the vehicle body width direction. Flanges on both sides of the underfloor portion are superimposed with, and joined by welding to, the floor panel.

A suspension member 22, illustrated in FIG. 1, is disposed at the vehicle body lower side of the pair of left and right front side members 30. The suspension member 22 is a member that supports front suspension on the left and right (not illustrated in the drawings). The suspension is a device coupling front wheels (not illustrated in the drawings) to the vehicle body front section 12A, and cushions vibrations travelling from the front wheels to the vehicle body front section 12A.

The suspension member 22 is disposed with its length direction along the vehicle body width direction. The suspension member 22 is supported suspended from the front side members 30 on both vehicle body width direction sides.

More specifically, lower end portions of extensions 23 are provided to front side portions on both vehicle body width direction sides of the suspension member 22. An upper end portion 23A of each extension 23 is attached to a rear end portion of the inner lower wall 34C of the side member front section 32 by a coupling member 24, serving as a coupling portion (see FIG. 2). Namely, the suspension member 22 is coupled through the coupling member 24 illustrated in FIG. 2 to a vehicle body front-rear direction rear portion of the side member front section 32 at a location further to the vehicle body front side than the connection portion 32D between the side member front portion 32 and the kick portion 40. Although not illustrated in the drawings, a rear side portion of the suspension member 22 is attached to lower walls of the side member rear sections 38 on both sides in the vehicle body width direction.

Detailed explanation follows regarding configuration of the side member front section 32.

As illustrated in FIG. 1, the side member front section 32 includes a front side location 32A that is disposed at the front side in the vehicle body front-rear direction, and also includes a rear side location 32R that is contiguous to the front side location 32A at the vehicle body rear side, and that is provided further to the vehicle body front side than the connection portion 32D between the side member front portion 32 and the kick portion 40. The rear side location 32R includes a first rear side location 32C that is disposed separated from the front side location 32A toward the vehicle body rear side, and also includes a second rear side location 32B linking between the front side location 32A and the first rear side location 32C. As illustrated in FIG. 2, a lower face 32A1 of the front side location 32A and a lower face 32C1 of the first rear side location 32C are each set at specific height positions, and the height position of the lower face 32C1 of the first rear side location 32C is set lower than the height position of the lower face 32A1 of the front side location 32A. Namely, a step is formed in the vehicle body up-down direction between the lower face 32C1 of the first rear side location 32C and the lower face 32A1 of the front side location 32A.

In the present exemplary embodiment, the height position of the lower face 32C1 of the first rear side location 32C is determined in consideration of the height position at which the upper end portion 23A of the extension 23 is joined to the side member front section 32 (the height position of the coupling member 24). The height position of the lower face 32A1 of the front side location 32A is determined in consideration of the placement of peripheral members such as the power unit.

The lower face 32A1 of the front side location 32A, and the lower face 32C1 of the first rear side location 32C that are at different height positions to each other are linked smoothly by a lower face 32B1 of the second rear side location 32B. The lower face 32B1 of the second rear side location 32B (a front portion of a lower face 32R1 of the rear side location 32R) is inclined toward the vehicle body upper side on progression toward the vehicle body front side. In other words, in the rear side location 32R, the extension direction of the lower face 32B1 of the second rear side location 32B is set in a direction intersecting with the extension direction of the lower face 32A1 of the front side location 32A as viewed from the side of the vehicle body, and the height position of the lower face 32R1 of the rear side location 32R is set lower than the height position of the lower face 32A1 of the front side location 32A.

As illustrated in FIG. 1, the inner member 34 includes a bent portion 42 bending obliquely toward the vehicle body rear and vehicle body width direction inside at a location further toward the vehicle body front side than the connection portion 32D between the side member front portion 32 and the kick portion 40. In the present exemplary embodiment, the bent portion 42 is set at the same location as a boundary 32X between the front side location 32A and the rear side location 32R.

The inner side wall 34A of the side member front section 32 is formed with a bead 44, serving as a weakened portion, at the vehicle body up-down direction upper side of the boundary 32X between the front side location 32A and the rear side location 32R. In other words, the bead 44 of the present exemplary embodiment is set at the bent portion 42.

The bead 44 is recessed toward the inside of the closed cross-section of the side member front section 32 at the inner side wall 34A, and extends along the vehicle body up-down direction, becoming gradually wider in the vehicle body front-rear direction on progression toward the vehicle body upper side. Namely, as illustrated in FIG. 2, an edge 44F on the vehicle body front side of the bead 44 is inclined in a straight line toward the vehicle body front side on progression toward the vehicle body upper side, and an edge 44R on the vehicle body rear side of the bead 44 is inclined in a straight line toward the vehicle body rear side on progression toward the vehicle body upper side. The width of an upper portion 44A of the bead 44 in the vehicle body front-rear direction is accordingly set greater than the width of a lower portion 44B of the bead 44 in the vehicle body front-rear direction. Namely, the bead 44 of the present exemplary embodiment has a quadrilateral shape with left-right symmetry (more specifically, a trapezoid), and narrows toward the lower side as viewed from the side of the vehicle body.

The bead 44 is set such that a first hypothetical extension line L1 that extends the line of inclination of the vehicle body front side edge 44F toward the lower side, and a second hypothetical extension line L2 that extends the line of inclination of the vehicle body rear side edge 44R toward the lower side, intersect with each other in the vicinity of a boundary X between the lower face 32A1 of the front side location 32A and the lower face 32R1 of the rear side location 32R (as an example, in the vicinity and at the upper side of the boundary X). Note that a bead, serving as a weakened portion, may also be set such that a first hypothetical extension line (L1) and a second hypothetical extension line (L2) intersect at the boundary X between the lower face 32A1 of the front side location 32A and the lower face 32R1 of the rear side location 32R (or in the vicinity and at the lower side of the boundary X).

An upper end portion of the bead 44 is set at a location touching an upper side ridge line 32L of the side member front section 32, so as to divide the upper side ridge line 32L to the front and rear. In contrast, a lower end portion of the bead 44 reaches a vehicle body up-down direction central portion of the inner side wall 34A. The upper end portion and the lower end portion of the bead 44 are set so as to run along the vehicle body front-rear direction. In the present exemplary embodiment, the vehicle body front-rear direction length of the upper end portion of the bead 44 is set at half the vehicle body up-down direction length of the bead 44 or less.

The bead 44 described above is set such that a crush amount at the upper side (the crush amount of the upper portion 44A along the vehicle body front-rear direction) when collision load F is input from the vehicle body front side is larger than a crush amount at the lower side (the crush amount of the lower portion 44B along the vehicle body front-rear direction). The bead 44 is positioned further to the vehicle body front side than the coupling member 24.

Operation and Advantageous Effects of the Exemplary Embodiment

Next, explanation follows regarding operation and advantageous effects of the exemplary embodiment described above. Note that front-on collision modes of the vehicle encompass offset collisions (ODB) and oblique collisions in the following explanation.

The lower face 32R1 of the rear side location 32R of the side member front section 32 is set at a lower height position than the lower face 32A1 of the front side location 32A of the side member front section 32. The extension direction of the front portion of the lower face 32R1 of the rear side location 32R (the lower face 32B1 of the second rear side location 32B) is set in a direction intersecting with the extension direction of the lower face 32A1 of the front side location 32A. Accordingly, when the collision load F is input to the front side member 30 in a front-on collision of the vehicle, stress is concentrated at the boundary X between the lower face 32A1 of the front side location 32A and the lower face 32R1 of the rear side location 32R, and the side member front section 32 attempts to fold deform toward the vehicle body upper side about an origin at the boundary X, so as to form an inverted V-shape.

In the present exemplary embodiment, the bead 44 is formed to the inner side wall 34A of the side member front section 32 at the vehicle body up-down direction upper side of the boundary X between the front side location 32A and the rear side location 32R. Accordingly, when the collision load F is input to the front side member 30 in a front-on collision of the vehicle, there is a concentration of stress at the bead 44 at the same timing as the concentration of stress at the boundary X between the lower face 32A1 of the front side location 32A and the lower face 32R1 of the rear side location 32R.

The bead 44 is set such that the crush amount at the upper side (the crush amount of the upper portion 44A in the vehicle body front-rear direction) is greater than the crush amount at the lower side (the crush amount of the lower portion 44B in the vehicle body front-rear direction) when the collision load F is input from the vehicle body front side. More specifically, in the present exemplary embodiment, the bead 44 becomes gradually wider in the vehicle body front-rear direction on progression toward the vehicle body upper side. Accordingly, when the bead 44 is crushed by the collision load F, the crush amount of the bead 44 in the vehicle body front-rear direction (the amount of rearward displacement) accordingly increases on progression toward the vehicle body upper side. When the collision load F is input to the side member front section 32 and the bead 44 is crushed (squashed), the side member front section 32 accordingly attempts to fold deform toward the vehicle body lower side about an origin at the bead 44, so as to form a V-shape.

Namely, a force acts in a direction to cancel out a force attempting to fold deform the side member front section 32 toward the vehicle body upper side at the same timing. Fold deformation of the side member front section 32 toward the vehicle body upper side is accordingly suppressed.

In the present exemplary embodiment, the rear side location 32R that has a lower face at a lower height position than that of the front side location 32A, includes the first rear side location 32C and the second rear side location 32B. The first rear side location 32C is disposed separated from the front side location 32A toward the vehicle body rear side, and forms a step between the lower face 32C1 of the first rear side location 32C and the lower face 32A1 of the front side location 32A. Accordingly, for example, in cases in which another member (such as the suspension member 22) is disposed at the vehicle body lower side of the rear side location 32R, the first rear side location 32C can easily be set as an attachment counterpart of the other member. Moreover, the second rear side location 32B links between the front side location 32A and the first rear side location 32C, and the lower face 32B1 of the second rear side location 32B is inclined toward the vehicle body upper side on progression toward the vehicle body front side. Accordingly, in a front-on collision of the vehicle, an excessive concentration of stress at the boundary between the front side location 32A and the rear side location 32R at the lower face side of the side member front section 32 can be better suppressed than, for example, in a comparative structure in which a step is formed between a lower face of a front side location and a lower face of a rear side location, and the positions of a rear end of the lower face of the front side location and a front end of the lower face of the rear side location are aligned with each other in the vehicle body front-rear direction.

In the present exemplary embodiment, the bead 44 is set at a location touching the upper side ridge line 32L of the side member front section 32. This thereby enables effective crushing of the bead 44 by the collision load F transmitted along the upper side ridge line 32L of the side member front section 32 in a front-on collision of the vehicle.

In the present exemplary embodiment, the bead 44 is positioned further to the vehicle body front side than a location at the vehicle body front-rear direction rear portion of the side member front section 32 where the rigidity is raised by the coupling member 24 coupling together the suspension member 22 and the side member front section 32. This thereby further facilitates the concentration of stress at the bead 44.

In the present exemplary embodiment, the inner member 34 of the side member front section 32 includes the bent portion 42 bending obliquely toward the vehicle body rear and vehicle body width direction inside at a location further toward the vehicle body front side than the connection portion 32D between the side member front portion 32 and the kick portion 40. There is accordingly a concentration of stress at the bent portion 42 when the collision load F is input to the side member front section 32 in a front-on collision of the vehicle. Crushing of the bead 44 by the collision load F can accordingly be promoted due to setting the bead 44 at the bent portion 42.

This thereby enables stable crushing of the bead 44 at the timing described above in a front-on collision. The force to cancel out the force attempting to fold deform the side member front section 32 toward the vehicle body upper side can accordingly be more stably generated.

As described above, the vehicle body front section structure 10 of the present exemplary embodiment enables fold deformation of the front side member 30 toward the vehicle body upper side to be suppressed in a front-on collision of the car (vehicle) 12. The fold deformation mode of the front side member 30 can accordingly be stabilized, and load can be suppressed from acting on the dash panel 20, when load is input to the front side member 30 in a front-on collision.

To supplement explanation from a different perspective, in a comparative structure, for example, reinforcement is used to raise the load bearing of an upper side ridge line in order to suppress fold deformation of the front side member toward the vehicle body upper side in a front-on collision. So doing requires reinforcement capable of coping with every envisaged input load, for various collision modes. Such reinforcement leads to increased weight and costs, and also leads to poorer fuel efficiency and the like. However, the present exemplary embodiment does not employ a reinforcement structure, thus avoiding drawbacks such as those of the comparative structure.

Supplementary Explanation of the Exemplary Embodiment

In the exemplary embodiment described above, the extension direction of the front portion of the lower face 32R1 of the rear side location 32R (the lower face 32B1 of the second rear side location 32B) is set in a direction intersecting with the extension direction of the lower face 32A1 of the front side location 32A as viewed from the side of the vehicle body. However, the rear side location may be configured by a rear side location of another configuration in which, for example, the extension direction over the entire region of the lower face is set in a direction intersecting with the extension direction of the lower face of the front side location as viewed from the side of the vehicle body. Namely, for example, configuration may be made such that the lower face of the rear side location links smoothly between the rear end of the lower face of the front side location and the front end of the lower face (upper end of the front face) of the kick portion.

In the exemplary embodiment described above, the weakened portion is configured by the bead 44 that is recessed toward the inside of the closed cross-section of the side member front section 32 at the inner side wall 34A, and that becomes gradually wider in the vehicle body front-rear direction on progression toward the vehicle body upper side. However, the weakened portion is not limited thereto. Namely, the weakened portion may, for example, be configured by another weakened portion, such as a thinned portion or a hole-formed portion that is formed to the inner side wall of the side member front section at a position close to the upper side ridge line, and that becomes gradually wider in the vehicle body front-rear direction on progression toward the vehicle body upper side, or may be configured by a weakened portion of plural linear notches that are recessed toward the cross-section inside of the side member front section at the inner side wall, and that are provided side-by-side in a fan shape spreading out in the vehicle body front-rear direction on progression toward the vehicle body upper side. As another modified example, the weakened portion may be a bead that projects out toward the outside of the closed cross-section of the side member front section at the inner side wall, and that becomes gradually wider in the vehicle body front-rear direction on progression toward the vehicle body upper side.

In the present exemplary embodiment described above, the side member front section 32 is formed with the closed cross-section portion extending along the vehicle body front-rear direction by the outer member 36 and the inner member 34; however, the side member front section may, for example, be formed from a single member with a closed cross-section structure extending along the vehicle body front-rear direction. In the exemplary embodiment described above, the bead 44, serving as the weakened portion, is set at the bent portion 42 of the inner member 34; however, the weakened portion may be formed to an inner member without a location corresponding to the bent portion 42.

In the exemplary embodiment described above, the bead 44, serving as a weakened portion, is positioned further to the vehicle body front side than the coupling member 24, serving as a coupling portion; however the position of the weakened portion need not be limited to such a position.

In the exemplary embodiment described above, explanation has been given regarding a case in which the vehicle body front section structure 10 is basically configured with left-right symmetry, and the bead 44 is provided on both the left and right sides of the vehicle body. However, for example, configuration may be made in which the weakened portion is only provided on the left side of the vehicle body, or in which the weakened portion is only provided on the right side of the vehicle body.

In the exemplary embodiment described above, the power unit disposed in the power unit chamber 16 illustrated in FIG. 1 is configured including an engine and a motor as an example; however, the power unit disposed in the power unit chamber may, for example, be a power unit of another configuration, such as a configuration provided with an engine but no motor, as in an engine-powered vehicle, or a configuration provided with a motor but no engine, as in an electric vehicle.

Note that the exemplary embodiment and the plural modified examples described above may be implemented in appropriate combinations.

Explanation has been given regarding an example of the present invention; however the present invention is not limited by the above, and obviously various other modifications may be implemented within a range not departing from the spirit of the present invention.

What is claimed is:

1. A vehicle body front section structure comprising:
   a dash panel that partitions a power unit chamber from a cabin positioned at a vehicle rear side of the power unit chamber; and
   a front side member comprising
      a side member front section extending along a vehicle body front-rear direction at a side portion of the power unit chamber, and
      a side member rear section formed with a kick portion that is contiguous to a rear end portion of the side member front section and extends toward a vehicle body lower side following the dash panel, wherein
   the side member front section comprises:
      a front side location disposed on the front side of the side member front section in the vehicle body front-rear direction;
      a rear side location that is contiguous to the front side location at a vehicle body rear side, and that is provided further to a vehicle body front side than a connection portion between the side member front section and the kick portion, with a height position of a lower face of the rear side location set lower than a height position of a lower face of the front side location, and with an extension direction of at least a front portion of the lower face of the rear side location set in a direction to intersect with an extension direction of the lower face of the front side location as viewed from the side of the vehicle body; and
      a weakened portion that is formed to a side wall of the side member front section at a vehicle body up-down direction upper side of a boundary between the front side location and the rear side location, and that is set such that a crush amount at an upper side of the weakened portion is greater than a crush amount at a lower side of the weakened portion when collision load is input from the vehicle body front side.

2. The vehicle body front section structure of claim 1, wherein the rear side location comprises:
   a first rear side location that is disposed separated from the front side location toward the vehicle body rear side, and that forms a step between a lower face of the first rear side location and the lower face of the front side location; and a second rear side location that links between the front side location and the first rear side location, and that has a lower face inclined toward the vehicle body upper side on progression toward the vehicle body front side.

3. The vehicle body front section structure of claim 1, wherein the weakened portion is set at a location touching an upper side ridge line of the side member front section.

4. The vehicle body front section structure of claim 1, wherein the weakened portion is configured by a bead that becomes gradually wider in the vehicle body front-rear direction on progression toward the vehicle body upper side.

5. The vehicle body front section structure of claim 1, wherein:

a suspension member is disposed at the vehicle body lower side of the front side member;

the suspension member is coupled through a coupling portion to a vehicle body front-rear direction rear portion of the side member front section at a location further to the vehicle body front side than the connection portion between the side member front section and the kick portion; and the weakened portion is positioned further to the vehicle body front side than the coupling portion.

6. The vehicle body front section structure of claim 1, wherein:

the side member front section is formed with a closed cross-section portion extending along the vehicle body front-rear direction by an outer member disposed at a vehicle body width direction outside and an inner member disposed at the vehicle body width direction inside of the outer member;

the inner member includes a bent portion bending obliquely toward the vehicle body rear and vehicle body width direction inside at a location further toward the vehicle body front side than the connection portion between the side member front section and the kick portion; and the weakened portion is set at the bent portion.

* * * * *